(12) United States Patent
Kauppila

(10) Patent No.: US 8,337,112 B2
(45) Date of Patent: *Dec. 25, 2012

(54) JOINT AND METHOD FOR CONNECTING MEMBERS END TO END

(76) Inventor: Richard Kauppila, Negaunee, MI (US)

( * ) Notice: Subject to any disclaimer, the term of this patent is extended or adjusted under 35 U.S.C. 154(b) by 396 days.

This patent is subject to a terminal disclaimer.

(21) Appl. No.: 12/558,799

(22) Filed: Sep. 14, 2009

(65) Prior Publication Data
US 2010/0074683 A1  Mar. 25, 2010

Related U.S. Application Data

(60) Provisional application No. 61/191,877, filed on Sep. 12, 2008.

(51) Int. Cl.
B25G 3/20 (2006.01)
F16B 2/00 (2006.01)
F16B 7/04 (2006.01)

(52) U.S. Cl. ........ 403/367; 403/192; 403/194; 403/377; 411/60.1; 411/63; 411/73; 411/74; 52/585.1; 52/707; 29/525.02; 29/525.11

(58) Field of Classification Search ........... 403/192, 403/193, 194, 231, 239, 240, 263, 365, 367, 403/372, 377, 408.1, DIG. 13, 292; 411/32, 411/33, 60.1, 60.2, 63, 71–75; 52/585.1, 52/704, 707; 29/525.01, 525.02, 525.11

See application file for complete search history.

(56) References Cited

U.S. PATENT DOCUMENTS

| | | | | | |
|---|---|---|---|---|---|
| 3,501,932 | A | * | 3/1970 | Bishop | 70/90 |
| 4,299,067 | A | * | 11/1981 | Bertschi | 52/127.12 |
| 4,477,204 | A | * | 10/1984 | Rohde et al. | 405/153 |
| 4,789,282 | A | * | 12/1988 | Abraham | 411/24 |
| 4,943,195 | A | * | 7/1990 | Fischer | 411/55 |
| 5,419,664 | A | * | 5/1995 | Hengesbach et al. | 411/61 |
| 5,810,505 | A | * | 9/1998 | Henriott et al. | 403/230 |
| 6,148,569 | A | * | 11/2000 | Giovannetti | 52/127.11 |
| 6,299,397 | B1 | * | 10/2001 | Mengel | 411/24 |
| 6,926,613 | B1 | * | 8/2005 | Binning | 473/31 |
| 7,223,045 | B2 | * | 5/2007 | Migli | 403/409.1 |

FOREIGN PATENT DOCUMENTS

FR  2651815 A1 *  3/1991

* cited by examiner

Primary Examiner — Michael P Ferguson
Assistant Examiner — Nahid Amiri
(74) Attorney, Agent, or Firm — John R. Benefiel

(57) ABSTRACT

A joint and method for connecting elongated members end to end in which outer sleeves are anchored in blind holes extending in from each end face and a threaded rod is advanced into threaded nut receptacles affixed to the inside end of each sleeve to draw the end faces into abutment.

10 Claims, 4 Drawing Sheets

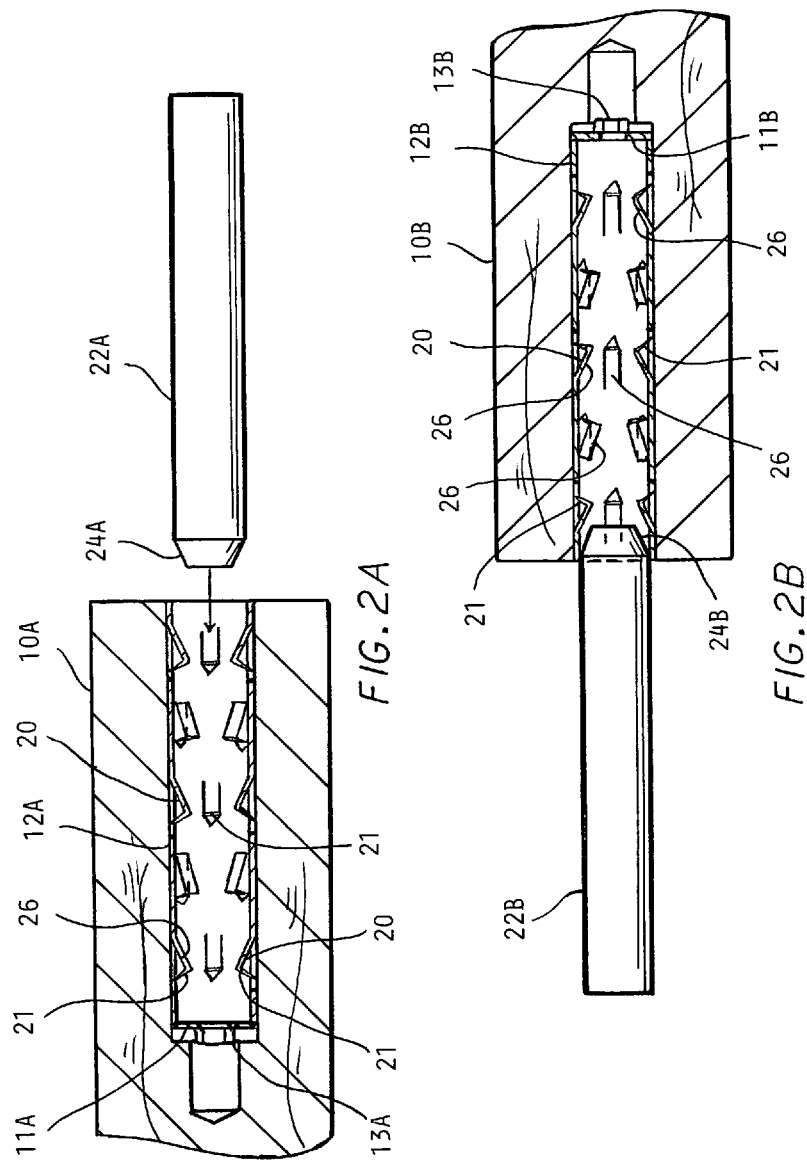

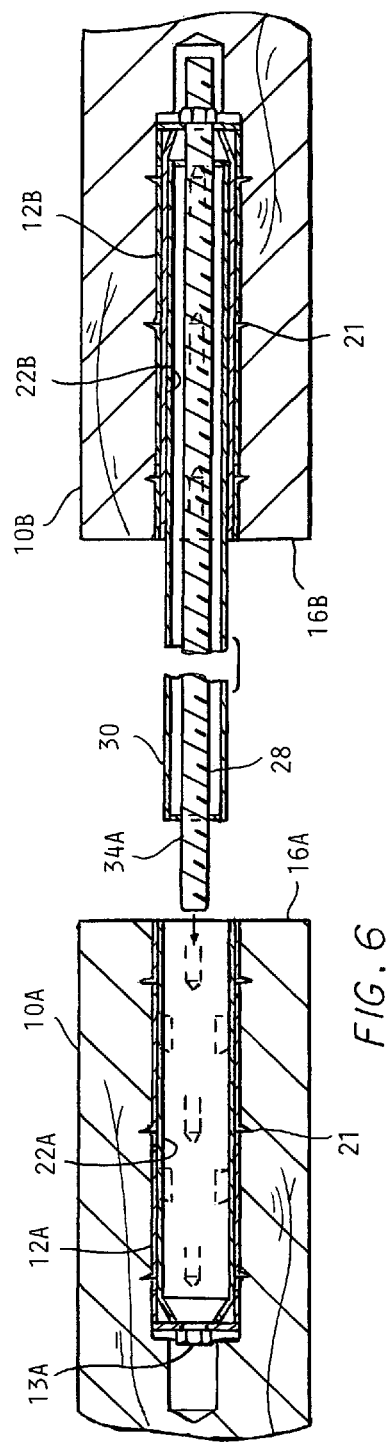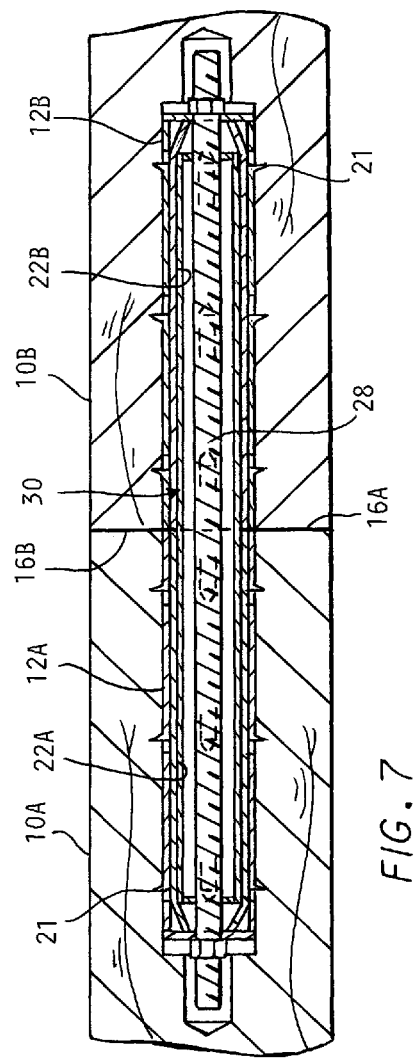

JOINT AND METHOD FOR CONNECTING MEMBERS END TO END

CROSS REFERENCE TO RELATED APPLICATIONS

This application claims the benefit of U.S. provisional application Ser. No. 61/191,877 filed on Sep. 12, 2008.

FIELD OF THE INVENTION

This invention concerns connections for establishing joints between members of a readily penetrable material such as wood timbers.

In the patent application Ser. No. 11/189,040 filed on Jul. 25, 2005, U.S. Publication No. 2009/0133359 A1 connections are described for joining members in which one of the members is formed with a through hole of a short enough depth to allow driving the head of a threaded component at the bottom of the hole to complete the connection.

This hole typically is formed through the side of one of the members and is aligned with the blind hole on the end of the other member.

For end-to-end joining of long members the through hole which is necessary for assembling the components of the connection described therein must be too deep as a practical matter to assemble the components.

The object of the present invention is to provide the general type of connector and method described in U.S. Ser. No. 11/189,040, (U.S. Publication No U.S. 2009/0133359 A1), but adapted to making an end-to-end connection between two long elongated members.

SUMMARY OF THE INVENTION

The above object and other objects which will be apparent to those knowledgeable in the art are accomplished by drilling a blind hole into each end of the members to be abutted and inserting an outer sleeve having a threaded receptable at one end into each blind hole so that the sleeve is flush with the end of the receiving member and so that a threaded receptacle is positioned at the bottom of the respective blind hole. A smaller counterbore may be providing extending from the bottom of each hole for clearance for a threaded locking rod to be threaded at each end to a respective threaded receptacle described below.

The outer sleeves are each anchored in their respective hole in which they are received by driving an inner slidably interfit sleeve into each outer sleeve causing a circumferential array of penetrating spikes formed around and along each of the outer sleeves to be forced out radially and set into the members and thus to anchor the outer sleeves positions in their respective blind holes.

An elongated threaded rod, which may be welded to a carrier sleeve with ends protruding out from a respective opposite end wall thereof, has one protruding end threaded into the threaded receptacle of one of the outer sleeves. The other protruding rod end is advanced into the other threaded receptacle in the other outer sleeve and the two members relatively rotated to advance the other rod end into the threaded receptacle until the member ends are drawn together into abutment with each other.

The two members are thereafter fixed together to not be relatively rotatable as a final step to prevent loosening of the joint.

DESCRIPTION OF THE DRAWINGS

FIGS. 2A and 2B are fragmentary sectional views of the members shown in FIGS. 1A and 1B, with one inner sleeve shown in section positioned to be inserted in the outer sleeve of one member in FIG. 2A and the other inner sleeve beginning to be inserted into the outer sleeve of FIG. 2B.

FIG. 6 is a sectional view of both member ends aligned with each other and with the threaded rod and carrier tube ready to be inserted in the inner sleeve installed in the other member.

FIG. 7 is a sectional view of both member ends drawn into abutment by full advance of the threaded rod end into the threaded receptacle on the inner end of the outer sleeve installed in the end hole in the other member.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The present invention is a further development of the connection and method shown in parent application U.S. Ser. No. 11/189,040 for joining wooden timbers, logs, etc. or members of another material which is easily penetrable with spikes, etc.

The present invention concerns joining elongated members such as poles, beams or logs which are too long as a practical matter to drill lengthwise holes completely through the members or to be able to access the connection components as necessary for assembly at the bottom of deep through hole drilled therein.

Figure 1A:
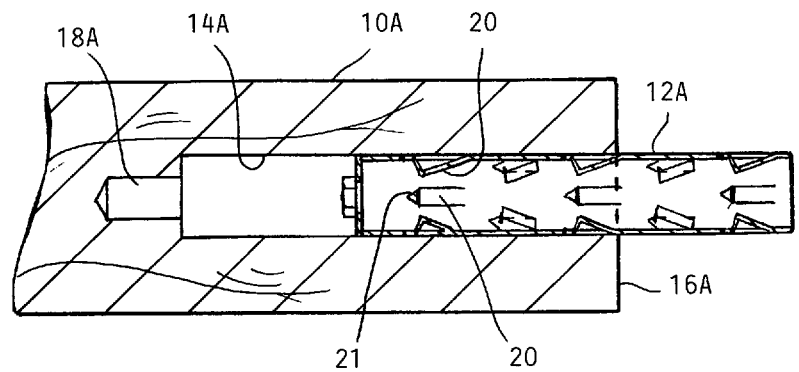
FIGS. 1A and 1B are fragmentary sectional views of the end of a respective one of a pair of elongated members to be joined together end to end, with a hole drilled into each member end and an outer sleeve shown in a pair of partial section partially inserted into one of the holes in FIG. 1A and completely inserted in the other hole in FIG. 1B.
Figure 1B:
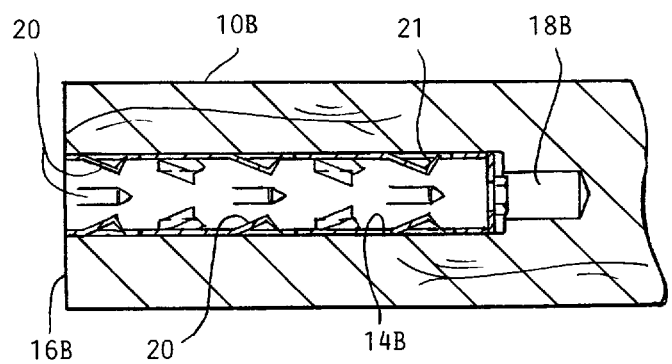
Figure 3:
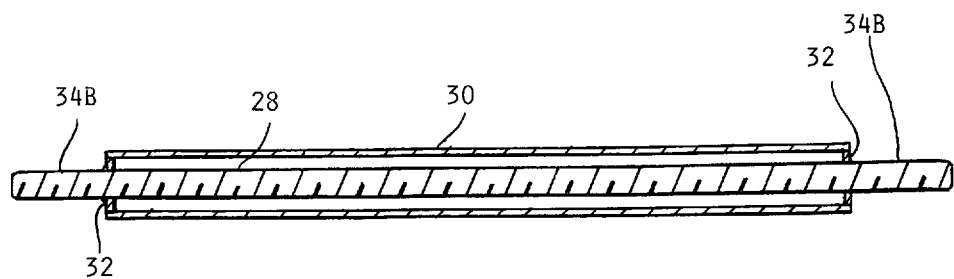
FIG. 3 is a front view of a threaded rod included in the connection components welded to a carrier tube shown in partial section, with opposite ends protruding from opposite ends of the carrier tube.

In FIGS. 1A and 1B, one end of a first elongated member 10A is shown with an outer sleeve 12A partially inserted in a blind hole 14A drilled into an end face 16A which is to be abutted against an end face 16B of a second member 10B shown in FIG. 1B.

The second member 10B is shown after an outer sleeve 12B has been fully inserted in a similar blind hole 14B drilled endwise into the end face 16B, with the outer sleeve 12B being flush with the end face 16B.

Both holes 14A, 14B have smaller diameter counterbores 18A, 18B provided so as to receive an end of threaded rod as described below.

The outer sleeves 12A, 12B are constructed of metal, preferably galvanized steel, and have a circumferential array of axially extending punch formed spike features 20 having pointed ends 21 bent to project radially out.

A threaded receptacle 13A, 13B is welded to an end wall 11A, 11B of each outer sleeve 12A, 12B having a hole aligned with the center of the associated hole 14A, 14B and outer sleeve 12A, 12B.

FIGS. 2A, 2B show the next step in which inner sleeves 22A, 22B are slidably fit into the inside of the outer sleeves 12A, 12B.

A tapered front end portion 24A, 24B of each inner sleeve 22A, 22B facilitates insertion and presents an inclined camming surface to angled portions 26 of spikes 20.

As the inner sleeves 22A, 22B are driven into the inside of outer sleeves 12A, 12B, the engagement of tapered end portions 24A, 24B with inclined portions 26 of the spikes 20 drives the spike tips 21 out and into the surrounding penetrable material of the members 10A, 10B.

The details of the spikes 20 is described in further detail in the above referenced parent application. This securely anchors the outer sleeves 12A, 12B in the respective holes 14A, 14B and the inner sleeves 22A, 22B and are left in their associated outer sleeve 12A, 12B to hold the spike tips 21 radially out and preventing retraction of the tip 21 and resultant loosening of the outer sleeves 12A, 12B over time.

Threaded rod 28 is assembled within a carrier tube 30 having end caps 32 formed with holes allowing opposite ends 34A, 34B of the threaded rod 28 to protrude out from the carrier tube 30.

The threaded rod 28 is welded to the end caps 32 to be fixed in that position within the carrier tube 30.

Figure 4:
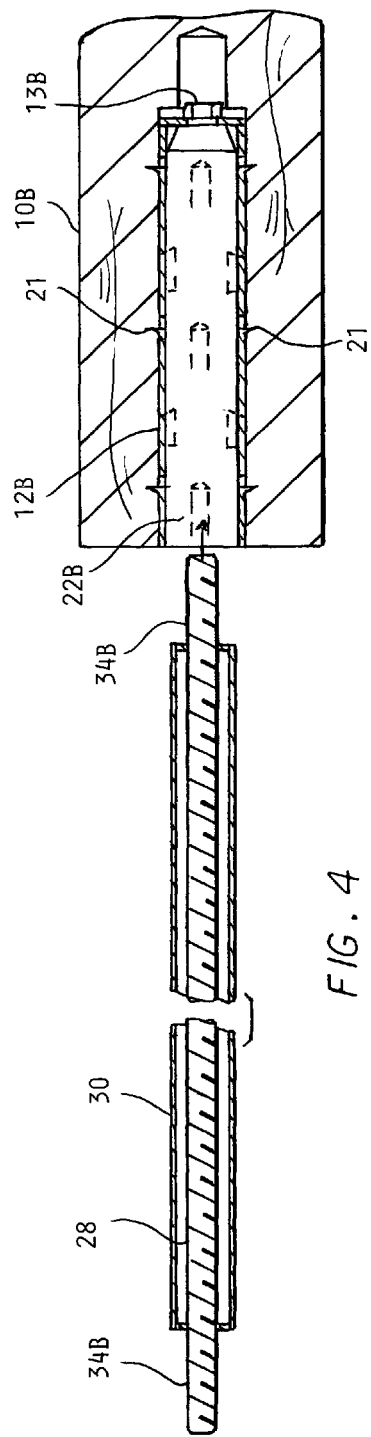
FIG. 4 is a sectional view of one member having inner and outer sleeves installed in the blind hole drilled in the end with the threaded rod and carrier tube in position to be inserted therein.
Figure 5:
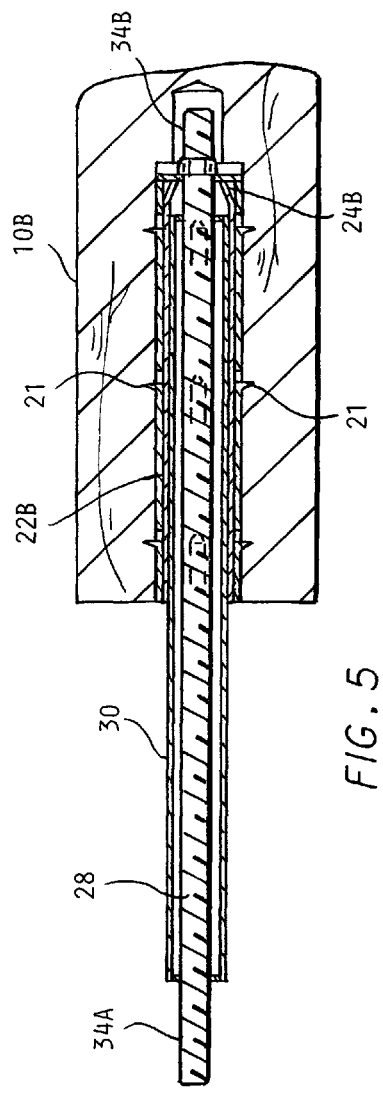
FIG. 5 is the view of the components shown in FIG. 4 with the threaded rod end fully advanced into the threaded receptacle at the inner end of the outer sleeve installed in one of the timbers end hole.

Referring to FIGS. 4 and 5, one end of the threaded rod 28 and carrier tube 30 is inserted into the inner sleeve 22B of one of the members 10B, the carrier tube 30 being a slidable fit therein.

The rod end 34B engages the threaded receptacle 13B, and is rotated to be advanced therein until the carrier tube 30 bottoms against the inside of the tapered end 24B of the inner sleeve 22B.

FIGS. 6 and 7 show the completion of the joint, with the other member 10A advanced over the right end of the carrier tube 32 and threaded rod end 34A engaged with the threaded receptacle 13A. The member 10A is then rotated to advance the rod end 34A into the threaded receptacle 13A bringing the end faces 16A, 16B of members 10A, 10B into abutment as shown in FIG. 7.

An epoxy or other adhesive may be applied to end faces 16A, 16B prior to their being brought into abutment to prevent loosening. Alternatively, pins can be driven into drilled cross holes (not shown) to maintain the two members 10A, 10B in their joined position by preventing relative rotation therebetween after assembly.

The invention claimed is:

1. A joint between two penetrable elongated members in a position with an end surface of a first member abutting against an end surface of a second member comprising:

a first sleeve anchored within a first blind hole extending in from said first member end surface by penetrating engagement with surrounding portions of said first member defining said first hole;

a second sleeve separate from said first sleeve fixedly secured in a second blind hole extending in from said second member end surface by penetrating engagement with surrounding portions of said second member defining said second hole, said sleeves overlapping with one sleeve having an end portion protruding from an associated member and slidably received within an inside diameter of the other sleeve with said surfaces of said members in said abutting position against each other;

said first and second sleeves secured in their respective associated blind holes by penetrating spike features on said sleeves penetrating radially into said respective portions of said penetrable members defining said first and second blind holes;

an internally threaded receptacle fixedly secured to an inmost end of each of said first and second sleeves; and a threaded rod extending through both of said sleeves and having opposite ends threaded into a respective one of said internally threaded receptacle fixed to an inner end of said first and second sleeves respectively, said rod rotated to an extent so that said end surfaces are drawn together and held in tight abutment with each other.

2. The joint according to claim 1 further including inner sleeves each slidably fit within an inside diameter of a respective one of said first and second sleeves to force out said spike features to penetrate into surrounding portions of said first and second members respectively.

3. The joint according to claim 2 wherein said threaded rod is secured to a carrier tube with opposite ends of said threaded rod protruding out from a respective opposite end of said carrier tube, said carrier tube having said opposite ends slidably fit within a respective one of said first and second inner sleeves, each end of said carrier tube substantially coextensively fit within said first and second inner sleeves with said protruding rod ends extending past said first and second inner sleeves respectively and threaded into a respective one of said threaded receptacles.

4. The joint according to claim 2 wherein each inner sleeve had a tapered end portion respectively engaging said spike features to cam the same out when said inner sleeves are forced into said first and second sleeves respectively.

5. The joint according to claim 2 wherein said members are constructed of wood to be easily penetrable by said spike features.

6. A method of joining one end of a first elongated penetrable member to an end of a second elongated penetrable member with respective end surfaces thereof in abutment, including forming a first blind hole extending into an end surface of said first penetrable member;

inserting a first sleeve into said first hole and securing the same therein by attachment to surrounding penetrable portions of said first member defining said first hole;

forming a second blind hole extending into an end surface of said second member;

inserting a second sleeve separate from said first sleeve into said blind hole in said second member and securing the same therein by attachment to surrounding penetrable portions of said second member defining said second blind hole;

inserting opposite respective ends of a threaded rod through a respective one of said first and second sleeves and threading the same into a respective internally threaded element fixed at the inside end of each of said sleeves so that said first and second members are drawn together by advancement of said threaded rod ends in said respective internally threaded elements sufficiently to establish a tight abutment of said end surfaces of said first and second elongated members said advancement of one of said threaded rod ends produced by rotation of one of said members.

7. The method according to claim 6 including securing said first and second sleeves to said first and second members respectively by forcing spike features formed on each of said sleeves out into said surrounding portions of said respective members defining said first and second blind holes.

8. The method according to claim 7 including forcing said spike features out by inserting an inner sleeve into an inside diameter of each of said first and second sleeves respectively to force spike features having portions disposed within each of said first and second sleeves out into said surrounding portions of a respective first and second members defining each of said blind holes.

9. The method according to claim 8 further including leaving said inner sleeves in place after forcing said spike features out.

10. The method according to claim 8 further including fixing said threaded rod within a carrier tube with opposite ends protruding out from opposite endwalls of said carrier tube and slidably interfitting said carrier tube with a respective inner sleeve.

* * * * *